United States Patent [19]

Perreault

[11] 3,761,144

[45] Sept. 25, 1973

[54] BOGIE-WHEEL SUSPENSION ASSEMBLY

[75] Inventor: Jules Perreault, Valcourt, Quebec, Canada

[73] Assignee: Bombardier Limited, Valcourt, Quebec, Canada

[22] Filed: Dec. 2, 1971

[21] Appl. No.: 204,077

[52] U.S. Cl. ................................. 305/27, 180/5 R
[51] Int. Cl. .......................................... B62m 27/02
[58] Field of Search ..................... 305/27; 180/5 R; 308/27, DIG. 7

[56] References Cited
UNITED STATES PATENTS

| | | | |
|---|---|---|---|
| 3,688,858 | 9/1972 | Jespersen | 180/9.2 R |
| 3,630,581 | 12/1971 | Gostomski | 180/5 R |
| 2,913,284 | 11/1959 | Zankl | 308/DIG. 7 |
| 3,285,676 | 11/1966 | Hetteen | 305/27 |
| 3,309,150 | 3/1967 | Marier | 305/27 |
| 3,684,043 | 8/1972 | Hirsch | 180/5 R |

Primary Examiner—Richard J. Johnson
Attorney—Christopher Robinson et al.

[57] ABSTRACT

The invention relates to an improved suspension system for vehicles, such as snowmobiles which derive their support from an endless belt or track in conjunction with a resiliently biased suspension system. The present invention provides a suspension system for the resiliently biased rolling support of an endless track on a vehicle chassis, comprising a trailing frame assembly adapted at an upper part for pivotable attachment to the vehicle chassis, and at a lower part for pivotable attachment to at least one wheel support member having at least two wheels mounted for rotation thereon one behind the other in the longitudinal direction of the chassis, the trailing frame is provided with springs connectable with the chassis for resiliently urging the frame and the wheels downwardly and forwardly with respect to the vehicle against the inner surface of the track.

7 Claims, 5 Drawing Figures

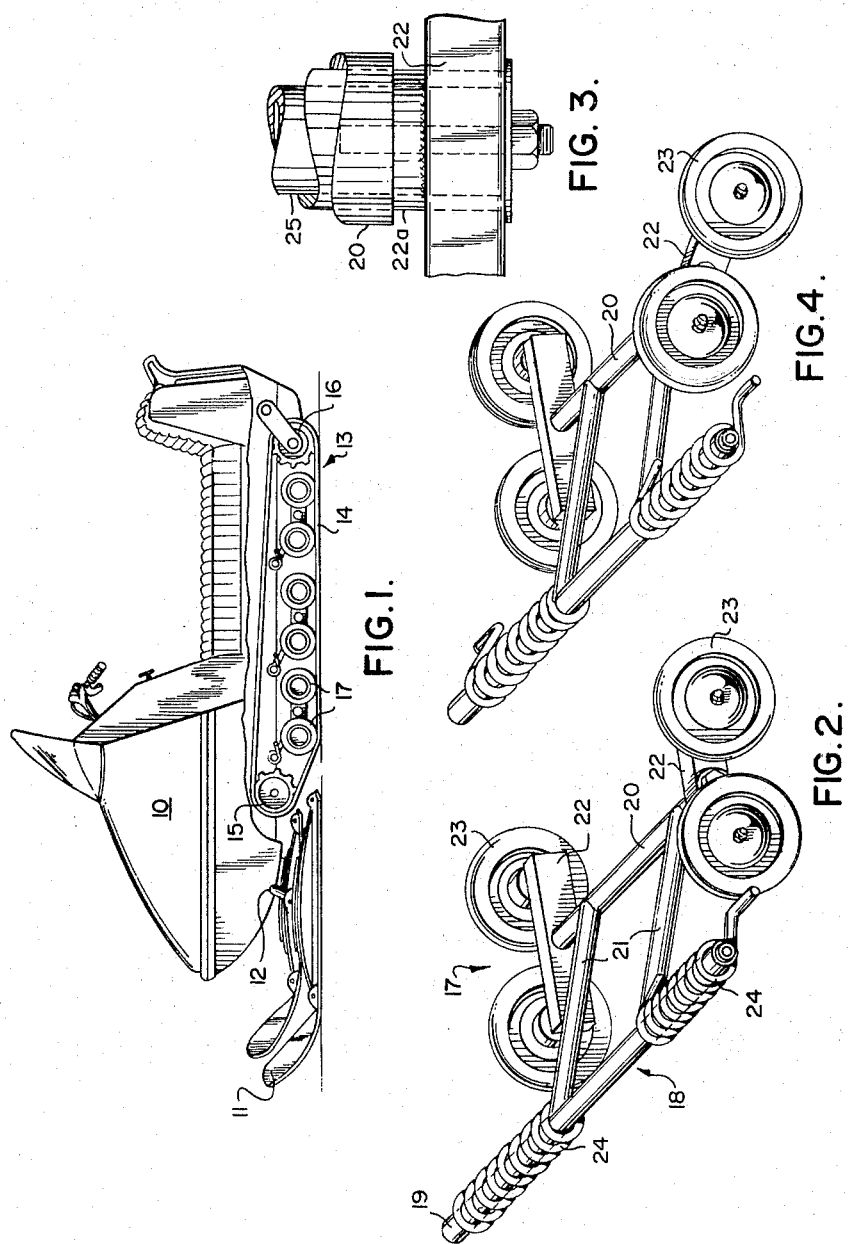

BOGIE-WHEEL SUSPENSION ASSEMBLY

BACKGROUND OF THE INVENTION

1. Field of the Invention

This invention relates to an improved suspension system for vehicles such as snowmobiles which are adapted to travel over snow and ice, and derive their support from an endless belt or track supported on a resilient biased suspension system.

In general arrangement, this type of vehicle comprises a main, lightweight body portion, a front steering system usually consisting in a pair of ski members movably controlled by a steering shaft. An endless track or belt is also provided, driven over the front and rear sprocket assemblies, and a resilient suspension system which bears upon the inner surface of the track and forces the track into engagement with the ground thus maintaining a high degree of traction.

2. Description of the Prior Art

One previous system utilized the well known bogie wheel suspension arrangement which consisted primarily in groups of small wheels which were attached to the vehicle chassis in a resilient manner. However, it was found that this system was very inflexible over rough terrain, as the springs used tended to tighten very quickly causing the vehicle to bounce with the resulting loss of tractive effort between the track and the ground.

A further system utilized a slide suspension arrangement where pairs of parallel skates extend along the entire length of the ground engaging portion of the track, and are spring biased from the vehicle chassis so as to provide some flexing when the vehicle is travelling over rough terrain. However, such arrangements were found to be susceptible to slide wear, when ground conditions did not provide lubrication i.e., as on bare ice, loose sand or gravelled surfaces.

SUMMARY OF THE INVENTION

The present invention seeks to overcome the disadvantates of prior arrangements and provides a wheeled suspension system which combines the wear characteristics of conventional bogie systems and the improved ride and stability heretofore found nowhere except in slide systems.

The invention consists in a suspension assembly for the resiliently biased rolling support of an endless track on a vehicle chassis, and comprises a trailing frame assembly adapted, at an upper part, for pivotable attachment from the vehicle chassis, and at a lower part for pivotable attachment to at least one wheel support member, said support member having at least two wheels mounted for rotation thereon, one behind the other in the longitudinal direction of the chassis, and said trailing frame being further provided with means connectable with said chassis for resiliently urging said frame and said wheels downwardly and forwardly with respect to said vehicle, against the inner surface of said track.

BRIEF DESCRIPTION OF THE DISCLOSURE

The invention will now be described by way of example only with reference to the following drawings in which:

FIG. 1 illustrates a side view of the suspension assembly of the present invention as installed in a snowmobile.

FIG. 2 is a perspective view of a single suspension unit and

FIG. 3 shows how the lower transverse cross shaft is connected with each wheel support member of the suspension assembly.

FIG. 4 is a similar view to FIG. 2 but discloses the pivoting action of one set of wheels when surmounting an obstacle.

DESCRIPTION OF THE PREFERRED EMBODIMENT

Figure 5:
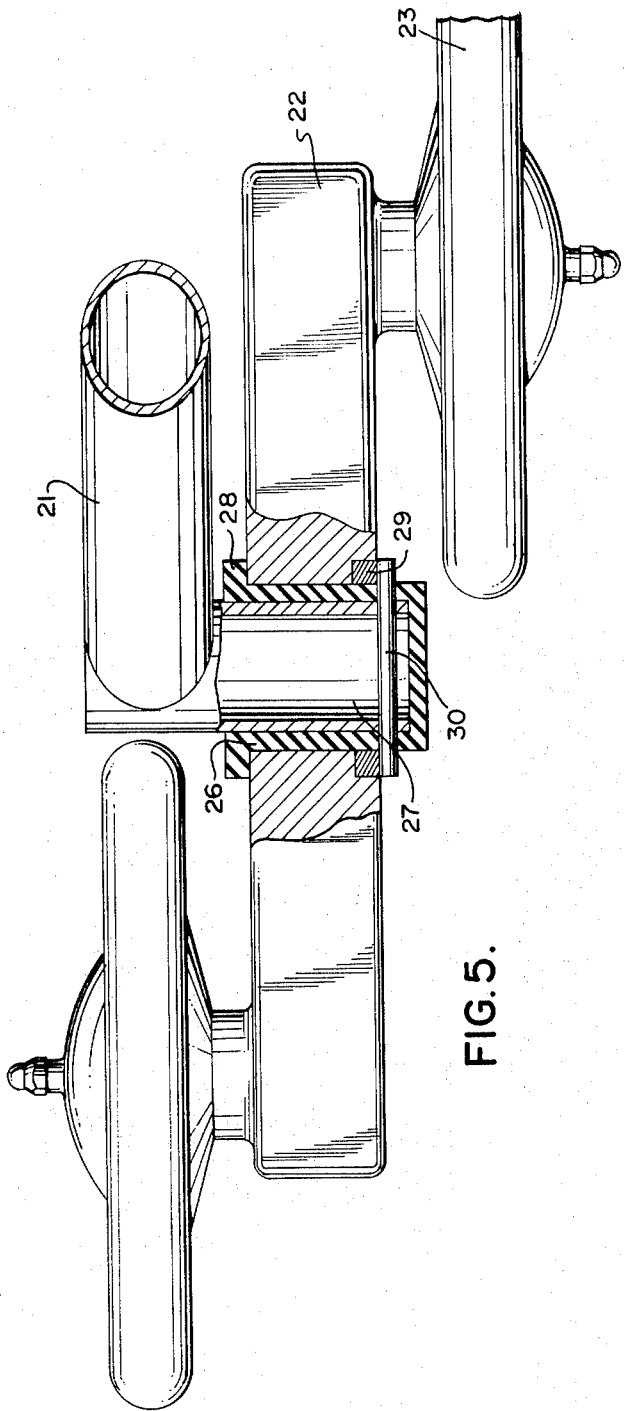
FIG. 5 shows a further method of connecting the wheel support member to a trailing frame of a two wheeled suspension unit.

Referring particularly to FIG. 1 of the drawings, there is shown a snowmobile employing the resilient track suspension system of the invention. The vehicle consists of a main, passenger carrying body section or frame 10, which also provides a housing for an internal combustion engine (not shown). Body portion 10 is mounted, and supported at its forward end by a pair of short skis 11 which are utilized for steering and are controllable by ski legs 12, and substantially along its remaining body length, by a track assembly 13. This track assembly 13 includes an endless track 14 which is adapted to be engaged by a pair of main driving sprockets 15 which are driven directly by the engine, and a pair of idler sprockets 16 adjustably mounted towards the rear of the vehicle body section 10.

The invention as disclosed in FIG. 1 provides three resiliently biased wheel supporting assemblies 17 to support the ground engaging surface of the endless track 14 and the vehicle frame 10. The number of assemblies 17 utilized will obviously depend upon the length of the vehicle and its supporting track, and the three units disclosed in FIG. 1 are therefore not intended as a limitation.

Referring now to FIG. 2 and 4 it will be seen that each suspension unit 17 comprises a main trailing frame 18 which is made up in this embodiment by an upper transverse cross-member 19 a lower transverse cross-member 20 and a pair of interconnecting trailing arm members 21. The lower transverse cross-member 20 is pivotably connected to a pair of wheel support members 22 upon each of which are mounted wheels 23. The pivotable connection between the lower transverse cross-member 20 of trailing frame 18 may be made by any suitable means. As shown in FIG. 3 the transverse member 20 be in the form of a hollow sleeve, through which a bearing shaft can be inserted, this shaft being affixed at either end to wheel support members 22. The arm members 21 interconnecting the lower transverse shaft, are also shown as tubular and welded or similarly fixed in position.

The upper transverse cross-member 19 is adapted for pivotal connection to the vehicle chassis 10. Once again, the means by which this connection is achieved may be varied, but in the preferred embodiment upper transverse cross-member 19 is formed as a hollow sleeve, through which a bearing shaft is passed, the ends of which may be detachably secured to the vehicle chassis in any convenient manner.

The trailing frame assembly 18 further includes a pair of torsion springs 24 mounted over each of the outwardly projecting ends of upper transverse cross-member 19, one end of each spring being fixedly held by arm members 21, the other ends of the spring being engageable with lugs (not shown) positioned on the under side of vehicle chassis 10.

Further, a bearing surface i.e., a nylon bushing (not shown) may be utilized as a friction reducing surface around cross-member 19, beneath the spring to ensure that spring movement is unimpaired.

The springs therefore associated with the trailing frame 18 to urge the assembly 17 downwardly and forwardly against the inside surface of the ground engaging portion of track 14 thus providing flexing of the suspension sssembly upwardly and rearwardly with respect to the longitudinal direction of the chassis.

FIG. 3 shows a preferred method of assembling wheel support members 22 to transverse cross shaft 20. As has previously been mentioned, cross shaft 20 is preferably of tubular form, and as can be seen from FIG. 3, is fitted over a stub tube 22a which passes through and is welded, or similarly attached to member 22. A central bearing shaft 25 is then inserted and the assembly is bolted together.

FIG. 4 illustrates the manner in which the wheel support members 22 pivot about the lower transverse member 20 when traversing rough ground.

FIG. 5 discloses a further embodiment of the invention which utilizes only two wheels instead of the previously described two pairs of wheels. The cross-shaft 19 has a single trailing arm 21 which is pivotally connected to wheel support member 22 by an arrangement which includes a capped bushing 26, fitted over a horizontally projecting stub 27 of arm 21. This bushig 26 may be made of any friction reducing material and is shown provided with a shoulder portion 28. The wheel support member 22 is also provided with a spacer 29 of similar material to bushing 26 and fits over the bushing to about shoulder 28.

The assembly is then cooperatively held in position by means of a pin 30 or other suitable retainer.

As will be appreciated this form of pivotal connection can equally be applied to the first embodiment.

It will now be seen that the present invention allows for a more even distribution of shock loads as has been obtained with prior systems with added comfort and ride stability due to the fact that the independent units are more flexible and are afforded an increased vertical travel. The principal feature of the pivotable wheel support member, allows for additional freedom of movement which previously would have resulted in the load being transmitted directly to the suspension as a whole, and hence to the vehicle thereby tending to lift the vehicle from the ground.

The pivoting of the wheel support member gives the suspension unit a walking action over undulating ground, for example, should impact loading occur on one side of the track only the wheel support member on that side will flex accordinly hwereas in prior systems the entire suspension unit would accept the full impact load no matter where on the track that loading were applied, Several modifications could be made to the arrangement disclosed without departing from the sopce of the invention. For example, the two pairs of wheels shown in FIGS. 2 and 4 are positioned to run outboard of the sprocket holes in the track. However, it may prove advantageous to stagger the wheels, and one method of staggering would be to shorten the lower cross shaft 20 on one wheeled unit preferably the central one of a three unit suspension system, thereby bringing the two pairs of wheels inboard of the sprocket holes on the track. This may assist in maintaining track alignment, and provide a more uniform weight distribution. As has been previously mentioned, any number of suspension units can be utilized and they can be detachably secured to the vehicle in a manner which allows quick and simple replacement of defective parts.

Whilst the preferred embodiments disclose units having one or two pairs of wheels, by utilizing a pivotal lower cross-member of different construction i.e., triangular (not shown), three wheels could be mounted on this cross-member and still remain within the scope of the invention which discloses the general concept of wheels carried by a longitudinal beam which in turn is pivoted to a downwardly biased trailing arm assembly.

We claim:

1. In a suspension assembly for the resiliently biased rolling support of an endless track on a vehicle chassis, the improvement comprising a trailing frame assembly pivotally attached at an upper part thereof to the vehicle chassis and pivoted at a lower part independently to a pair of laterally spaced wheel support members each having at least two wheels mounted for rotation thereon one behind the other in the longitudinal direction of the chassis, such that each of said wheel support members is capable of free pivotal movement independently of the other of said wheel support members, said trailing frame being further provided with means which co-operate with said chassis to resiliently urge said frame and said wheels downwardly and forwardly with respect to said vehicle against the inner surface of said track.

2. A suspension assembly as claimed in claim 1 wherein said upper transverse cross-member comprises a tubular sleeve through which a bearing shaft may be inserted for connection to the vehicle chassis.

3. A suspension assembly as claimed in claim 1 wherein said lower transverse cross-member comprises a tubular sleeve through which a bearing shaft is positioned for pivotal connection to said wheel support members.

4. A suspension assembly as claimed in claim 1 wherein said trailing frame assembly comprises an upper transverse cross-member and a lower transverse cross-member interconnected by at least one trailing arm member extending at right angles therebetween.

5. A suspension assembly as claimed in claim 4 wherein said means for resiliently urging said frame comprises spring means mounted upon said upper transverse cross-member, said spring means being held in part by said trailing arm member, and in part by said vehicle chassis.

6. A suspension assembly as claimed in claim 1 wherein included in the assembly of said trailing frame to said at least onewheel support member is a bushing made of friction reducing material.

7. A suspension assembly as claimed in claim 6 wherein said bushing is mounted on a lower outward projecting portion of said trailing frame and supports said wheel support member in pivotal relationship thereto.

* * * * *

UNITED STATES PATENT OFFICE
CERTIFICATE OF CORRECTION

Patent No. 3,761,144                  Dated September 25, 1973

Inventor(s) PERREAULT, JULES

It is certified that error appears in the above-identified patent and that said Letters Patent are hereby corrected as shown below:

Please add the following to the heading of the patent:

[30] Foreign Application Priority Data

October 15, 1971 Canada        125,287

Signed and sealed this 27th day of August 1974.

(SEAL)
Attest:

McCOY M. GIBSON, JR.                C. MARSHALL DANN
Attesting Officer                   Commissioner of Patents